United States Patent Office 3,247,243
Patented Apr. 19, 1966

3,247,243
OXIMINO ETHERS OF PHENYLACETO-PHENONES
Frank J. Villani, West Caldwell, N.J., assignor to Schering Corporation, Bloomfield, N.J., a corporation of New Jersey
No Drawing. Filed June 28, 1963, Ser. No. 291,259
3 Claims. (Cl. 260—501)

This invention relates to compositions of matter identifiable as oximino derivatives of α-phenylacetophenones and to processes for making and using such compositions.

The invention sought to be patented in its composition aspect is described as residing in the concept of a chemical compound having the molecular structure of an α-phenylacetophenone oxime in which the hydrogen atom of the oximino portion has been replaced by the substituent —Q—T, with Q being lower alkylene and T is a di-lower alkyl amino group or its hereinafter disclosed equivalent.

The invention sought to be patented in its process aspect is described as residing in the concept of preparing the tangible embodiments of the composition aspect by the reaction of an α-phenylacetophenone with a substituted hydroxylamine, that is, one of the formula $H_2NOQT$ (where Q and T are as above defined) or in the alternative reacting an α-phenylacetophenone oxime with an alkylating agent such as of the formula ClQT (where Q and T are as above defined).

The tangible embodiments of the composition aspect of the invention possess the inherent general physical properties of being substantially insoluble in water, soluble in aqueous acid and soluble in most common organic solvents. These compositions are generally high boiling liquids purifiable by vacuum distillation.

The tangible embodiments of the invention possess the inherent applied use characteristics of exerting an antifertility effect as evidenced by pharmacological evaluation in female rats subjected to standard mating tests. In addition, they exert an anticholesterimic effect, as evidenced by pharmacological evaluation.

Each of the aromatic rings of the α-phenylacetophenone oximino embodiment may contain substituents in one or more of the available positions, said substituents being those normally associated with such structures as halogen, hydroxyl, lower alkoxy, lower alkanoyloxy and lower alkyl. A desirable structure is that containing methoxy in at least one of the two available para positions and preferably in both positions. The α-carbon atom of the α-phenylacetophenone preferably contains a lower alkyl group with ethyl being the substituent of choice. All of these structures are contemplated as essential equivalents although they indeed may differ somewhat in the degree of activity elicited.

As used herein, the term "lower alkylene" means a bivalent hydrocarbon radical including straight and branched chain radicals among which are ethylene, 1,3-propylene, 1,2-propylene, 1,4-butylene, 1,2-butylene, 1,3-butylene, 1,5-pentylene, 2-ethyl-1,3-propylene and the like. Further, as used herein, the term "di-lower alkylamino" means an amino group substituted by lower alkyl radicals including the straight and branched chain radicals among which are methyl, ethyl, propyl and the like as well as the obvious cyclic equivalents of such as, for example, pyrrolidine, piperidino, morpholino and piperazino.

In one of the process aspects, the tangible embodiments of this invention are prepared by reacting an α-phenylacetophenone with a di-lower alkyl amino lower alkyl hydroxylamine (referred to above as $H_2NOQT$). The substituted hydroxylamine reagent is preferably used in the form of its acid addition salt, such as in the form of a dihydrochloride. The substituted hydroxylamine reagent can be prepared by methods well known in the art. Exemplary of such known methods is the following general procedure which involves treating an acetone oxime (I) with a dialkylaminoalkylhalide (dimethylaminoethylchloride, (II), in the presence of a base such as sodamide or sodium ethoxide. The dimethylaminoethyloximino derivative (III) is isolated by distillation upon treatment with dilute acid, the oxime (III) is split regenerating acetone and the substituted hydroxylamine (IV) which is used in preparing a tangible embodiment of the instant invention.

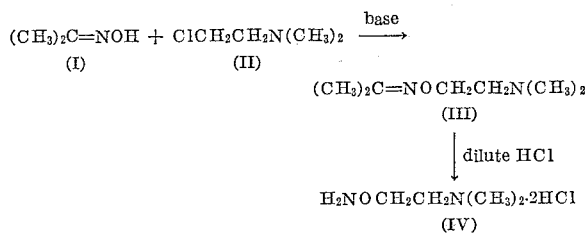

$$(CH_3)_2C=NOH + ClCH_2CH_2N(CH_3)_2 \xrightarrow{base}$$
(I)    (II)

$$(CH_3)_2C=NOCH_2CH_2N(CH_3)_2$$
(III)

↓ dilute HCl $$H_2NOCH_2CH_2N(CH_3)_2 \cdot 2HCl$$
(IV)

The other amino alkylhydroxylamines discussed above in conjunction with the definitions of Q and T are the full equivalents of dimethylaminoethoxyamine, IV above, and can be prepared in a manner similar to that described for preparing dimethylaminoethoxyamine.

The substituted hydroxylamine reagent (IV) is reacted with an α-phenylacetophenone (V) preferably in a polar organic solvent in the presence of a tertiary base. It has been found that ethanol-pyridine affords a satisfactory solvent. Heating the mixture at reflux results in oximation of the α-phenylacetophenone (V) resulting in the formation of a tangible embodiment of this invention (VI). This latter salt is transformed into its base form (VII) by usual procedures involving use of a base and extracting solvents such as chloroform. The compounds such as VII are purified in the first instance by distillation. By way of illustration, the following reaction scheme is presented showing the transformation of α-ethyl-α-p-methoxyphenyl-4-methoxyacetophenone:

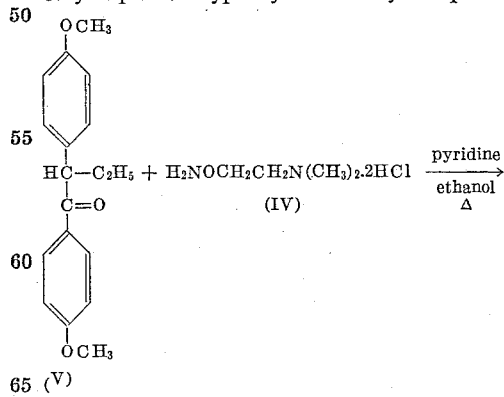

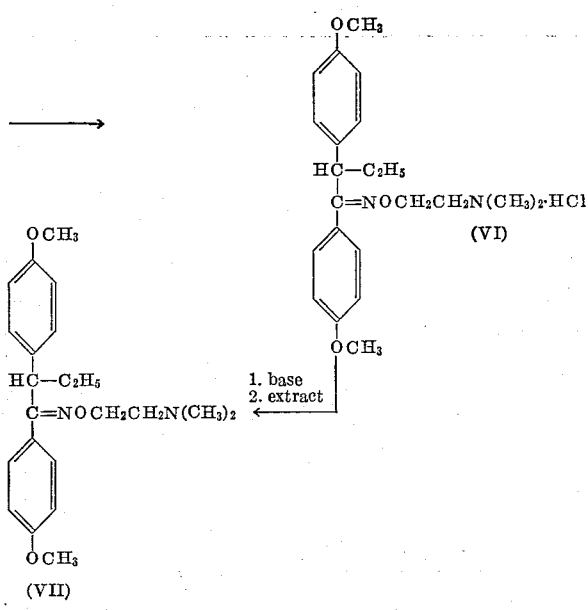

An alternate method for preparing the tangible embodiment of this invention is shown in the following general procedure which involves treating an α-phenylacetophenone oxime (VIII) with a di-lower alkylaminoalkyl-halide (II) in the presence of a basic agent followed by work-up in a usual manner. There is thus produced the oximino derivative, VII:

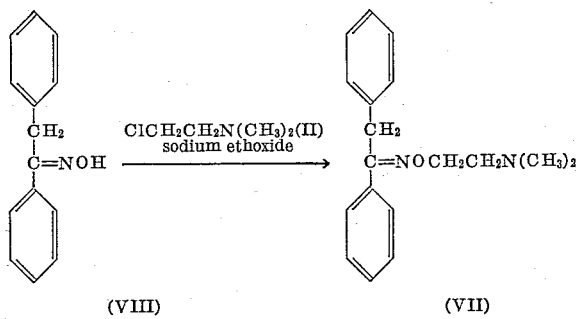

This latter alkylation reaction is generally effected in a refluxing solvent and worked up by neutralization and extraction. The base is present to take up the acid formed during the reaction; however, as will be apparent to one skilled in the art, the reactions may be effected with a base which may be added sequentially to neutralize the acid addition salt of the reaction product.

The following preparations and examples are illustrative of the preferred modes for carrying out the invention:

PREPARATION OF STARTING MATERIALS

Preparation A.—Oxime Reagent

DIMETHYLAMINOETHOXYAMINE DIHYDROCHLORIDE

Admix 73 g. acetone-oxime, 1 mole of dimethylaminoethylchloride hydrochloride, 427 g. of anhydrous potassium carbonate and 1.5 l. benzene. Stir and reflux overnight. Cool, filter, and wash precipitate with hot benzene. Combine filtrates, concentrate to a residue and distill in vacuo to obtain the dimethylaminoethyl ether of acetone-oxime (B.P. 85–88°/50 mm.).

Admix 100 g. of acetone-oxime of the above and 1 liter of 10% aqueous hydrochloric acid. Stir on a steam bath for 15 hours. Concentrate to a residue in vacuo. Recrystallize the residue from methanol ether solvent obtaining dimethylaminoethoxyamine dihydrochloride, M.P. 181–182.5° C.

By substituting other equivalent tertiary-aminoalkyl-chloride hydrochlorides for dimethylaminoethylchloride hydrochloride in the above preparation, the corresponding t-aminoalkoxyamine hydrochlorides are obtainable. Accordingly, there may be prepared by this method oxime reagents exemplified by the following alkoxyamines (it is understood that these reagents are prepared as above and are obtained in the form of their dihydrochloride salts): dimethylaminopropoxyamine, dimethylaminobutoxyamine, diethylaminoethoxyamine, diethylaminopropoxyamine, diethylaminoisopropoxyamine, diethylaminopentoxyamine pyrrolidinoethoxyamine, pyrrolidinopropoxyamine, piperidinoethoxyamine, piperidinopropoxyamine, morpholinoethoxyamine, morpholinobutoxyamine, piperazinoethoxyamine, N-1-methyl-N-4-piperazinoethoxyamine and N-1-(hydroxyethyl)-N-4-propoxyamine.

Starting materials such as the α-phenylacetophenones and oximes thereof are for the most part known in the art or are preparable by methods described in the art.

*Example 1.*—Dimethylaminoethyl ether of α-ethyl-α-(p-methoxy-phenyl)-4-methoxyacetophenone oxime from the oxime

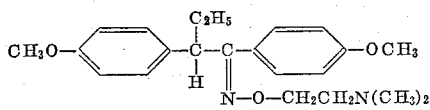

Prepare a solution of sodium ethoxide from 2 g. of sodium and 100 ml. of ethanol. Add 9 g. of α-ethyl-α-(p-methoxyphenyl)-4-methoxyacetophenone oxime. Stir for 10 minutes and then add 6 g. of dimethylaminoethylchloride hydrochloride. Stir and reflux 12–14 hours. Remove solvent by evaporating in vacuo. Dissolve residue in water (which should test alkaline) and extract with ether. Extract the ether solutions with dilute hydrochloric acid. Neutralize the acid solution with excess sodium hydroxide and extract the slightly alkaline mixture with chloroform. Distill in vacuo obtaining the product of this example, B.P. 219–221°/2 mm. ($n_D^{25}$ about 1.5659).

By substituting different phenylacetophenones and/or different amino alkylating agents in the foregoing procedure, products equivalent to the foregoing are obtained. Listed below in tabular form are representations of the starting oxime; amino alkylating agent. The product obtained from such reactants is analogous to the ether of this example differing in structure only as the reactants themselves differ structurally from the reactants described herein:

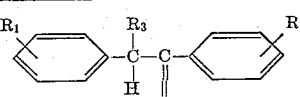

| $R_1$ | $R_2$ | $R_3$ | Aminoalkylchloride Hydrochloride |
|---|---|---|---|
| H | H | H | dimethylaminoethyl. |
| p-OCH$_3$ | p-OCH$_3$ | C$_2$H$_5$ | Do. |
| H | p-OCH$_3$ | CH$_3$ | Do. |
| p-OCH$_3$ | p-OCH$_3$ | H | Do. |
| p-OCH$_3$ | p-OCH$_3$ | C$_2$H$_5$ | diethylaminoethyl. |
| p-OCH$_3$ | p-OCH$_3$ | C$_2$H$_5$ | dimethylaminopropyl. |
| m-OCH$_3$ | m-OCH$_3$ | C$_2$H$_5$ | dimethylaminoethyl. |
| p-OCH$_3$ | p-OCH$_3$ | C$_2$H$_5$ | 2-pyrrolidinoethyl. |
| p-OCH$_3$ | p-OCH$_3$ | C$_2$H$_5$ | 2-piperidinoethyl. |
| p-OCH$_3$ | p-OCH$_3$ | C$_2$H$_5$ | 3-(N-methyl-piperizino)-propyl. |

*Example 2.—Dimethylaminoethyl ether of α-ethyl-α-(p-methoxyphenyl)-4-methoxyacetophenone oxime from the acetophenone*

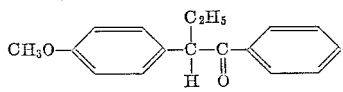 + H₂NOCH₂CH₂N(CH₃)₂·2HCl ⟶ 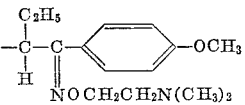

Dissolve 28.4 g. of α-ethyl-α-(p-methoxyphenyl)-4-methoxyacetophenone in a solution of 100 ml. of pyridine and 100 ml. ethanol. Add 20 g. of dimethylaminoethoxyamine dihydrochloride. Stir and reflux for six hours. Remove solvents in vacuo, dissolve residue in water and render the aqueous mixture alkaline with sodium bicarbonate solution. Extract the mixture with ether, and then extract the ether solution with dilute hydrogen chloride. Render the acid solution alkaline with ammonium chloride and extract with chloroform. Distill as in Example I.

By substituting equivalent quantities of different acetophenones and/or different oximating agents in the foregoing procedure, equivalent products are obtained. Representations of various reactants are shown in the following tabulation. The products obtained therefrom are analogous to the ether of this example:

| Acetophenone | | | Oximinator (-oxyamine dihydrochloride) |
|---|---|---|---|
| R₁ | R₂ | R₃ | |
| p-Cl | p-OCH₃ | C₂H₅ | dimethylaminoeth- |
| p-OH | p-OH | C₂H₅ | dimethylaminoeth- |
| p-OCH₃ | p-OCH₃ | CH₃ | dimethylaminoeth- |
| p-OCH₃ | p-OCH₃ | n-C₃H₇ | dimethylaminoeth- |
| p-OCH₃ | p-OCH₃ | i-C₃H₇ | dimethylaminoeth- |
| p-OCH₃ | p-OCH₃ | butyl (n, i, t) | dimethylaminoeth- |
| p-OCH₃ | p-OCH₃ | cyclohexyl | dimethylaminoeth- |
| p-OCH₃ | p-OCH₃ | p-methoxy phenyl | dimethylaminoeth- |
| H | p-OCH₃ | C₂H₅ | dimethylaminoeth- |
| H | p-OCH₃ | C₂H₅ | dimethylaminoprop- |
| p-OCH₃ | p-OCH₃ | C₂H₅ | pyrrolidinoeth- |
| p-OCH₃ | p-OCH₃ | C₂H₅ | piperidinoeth- |
| p-OCH₃ | p-OCH₃ | C₂H₅ | morpholinoeth- |

It will be apparent to one skilled in the art that acid addition salts of the oximino ethers may be prepared by any of the conventional methods such as dissolving the basic ether in an organic solvent in which the salt is not soluble and adding thereto an acid containing the desired anion. The precipitated salt is purified by recrystallization from solvents such as alcoholic ether. Representative pharmaceutically acceptable acid addition salts are formed with inorganic acids such as hydrochloric and organic acids such as maleic, succinic, salicylic and the like. Salt formation generally renders the oximino ether water soluble and affords a means for handling the ether in the form of a crystalline solid.

It is known to chemists that the oximino ethers of this invention may exist in either one or both of two geometric configurations; one being syn and the other anti. Either or both structures are contemplated as with the scope of this invention.

I claim:

1. A compound selected from the group consisting of a free base and its pharmaceutically acceptable acid addition salts, the free base having the structural formula:

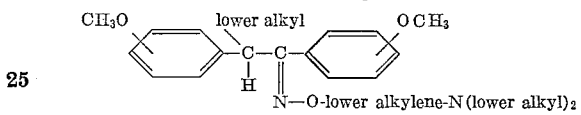

2. The compound having the structural formula:

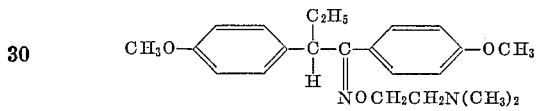

3. A pharmaceutically acceptable acid addition salt of the compound of claim 2.

References Cited by the Examiner

UNITED STATES PATENTS

| | | | |
|---|---|---|---|
| 1,921,424 | 8/1933 | Nabenhauer | 260—566 |
| 2,712,031 | 6/1955 | Huffman | 260—566 XR |
| 2,832,804 | 4/1958 | Richter et al. | 260—566 XR |
| 2,888,464 | 5/1959 | Shapiro et al. | |
| 2,921,080 | 1/1960 | Archer et al. | 260—566 XR |
| 3,060,177 | 10/1962 | Druey et al. | 260—566 X |

FOREIGN PATENTS 301,956  12/1928  Great Britain.

OTHER REFERENCES

Nicolaus et al.: Helv. Chim. Acta, vol. 45, pp. 1381–1395.

Sieger et al.: Org. Chem., vol. 22, pp. 951–954 (1957).

CHARLES B. PARKER, *Primary Examiner.*